United States Patent
DeLuca et al.

(10) Patent No.: US 9,258,524 B2
(45) Date of Patent: Feb. 9, 2016

(54) STREAMING PLAYBACK WITHIN A LIVE VIDEO CONFERENCE

(71) Applicant: International Business Machines Corporation, Armonk, NY (US)

(72) Inventors: Lisa Seacat DeLuca, Baltimore, MD (US); Lydia M Do, Raleigh, NC (US); Pamela A Nesbitt, Ridgefield, CT (US)

(73) Assignee: International Business Machines Corporation, Armonk, NY (US)

(*) Notice: Subject to any disclaimer, the term of this patent is extended or adjusted under 35 U.S.C. 154(b) by 127 days.

(21) Appl. No.: 14/041,740

(22) Filed: Sep. 30, 2013

(65) Prior Publication Data

US 2015/0092009 A1 Apr. 2, 2015

(51) Int. Cl.
*H04N 7/14* (2006.01)
*H04N 7/15* (2006.01)

(52) U.S. Cl.
CPC . *H04N 7/15* (2013.01); *H04N 7/147* (2013.01)

(58) Field of Classification Search
CPC . H04M 3/5315; H04N 7/147; H04L 65/1096; H04L 65/4007
USPC .......................... 348/14.08; 370/260; 709/204
See application file for complete search history.

(56) References Cited

U.S. PATENT DOCUMENTS

| | | | |
|---|---|---|---|
| 6,698,020 B1* | 2/2004 | Zigmond | H04N 5/44513 348/E5.102 |
| 8,175,638 B2 | 5/2012 | Cowherd | |
| 8,243,116 B2 | 8/2012 | Qvarfordt et al. | |
| 8,310,521 B2 | 11/2012 | Zhang et al. | |
| 2008/0062250 A1* | 3/2008 | Rye et al. | 348/14.01 |
| 2011/0235706 A1* | 9/2011 | Demircin et al. | 375/240.03 |
| 2012/0246689 A1 | 9/2012 | Thomas et al. | |
| 2013/0036201 A1 | 2/2013 | McLaughlin | |
| 2014/0267578 A1* | 9/2014 | Rowe et al. | 348/14.11 |

FOREIGN PATENT DOCUMENTS

WO 2008131344 A1 10/2008

OTHER PUBLICATIONS

"Google Hangouts", http://www.google.com/+/learn more/hangouts/, printed Jul. 22, 2013 (6 pps.).

* cited by examiner

*Primary Examiner* — Creighton Smith
(74) *Attorney, Agent, or Firm* — Maeve McCarthy

(57) ABSTRACT

A method for streaming playback within a live video conference. The method includes, a computer detecting access to a video conference using a live interface. The method includes, the computer receiving an indication of an interrupt condition. The method includes, the computer retrieving a selected content. The method includes, the computer inserting the selected content into the video conference, and the computer playing the selected content within the video conference.

18 Claims, 4 Drawing Sheets

STREAMING PLAYBACK WITHIN A LIVE VIDEO CONFERENCE

BACKGROUND

1. Field of the Invention

The present invention relates generally to the field of video conferencing, and more particularly to streaming playback within a live video conference.

2. Description of the Related Art

Video conferencing allows two or more locations, and participants at those locations, to communicate by simultaneous two-way video and audio transmissions through the use of telecommunication technologies. Recently, video conferencing has become more popular due to easily available high speed Internet, reduced costs of high quality web cameras, and powerful computing processors and video compression techniques. There are, however, multiple issues with current video conferencing systems that inhibit the effectiveness of the video conference to the participant or user. One of the main issues is the users' inability to perform other tasks during a video conference. For example, if a user needs to take a phone call, talk to someone within their office, or send an e-mail, they cannot perform these tasks without appearing to have left the video conference.

SUMMARY

Embodiments of the present invention disclose a method, computer program product, and computer system for streaming playback within a live video conference. The method includes, a computer detecting access to a video conference using a live interface. The method includes, the computer receiving an indication of an interrupt condition. The method includes, the computer retrieving a selected content. The method includes, the computer inserting the selected content into the video conference, and the computer playing the selected content within the video conference.

DETAILED DESCRIPTION

Figure 1:
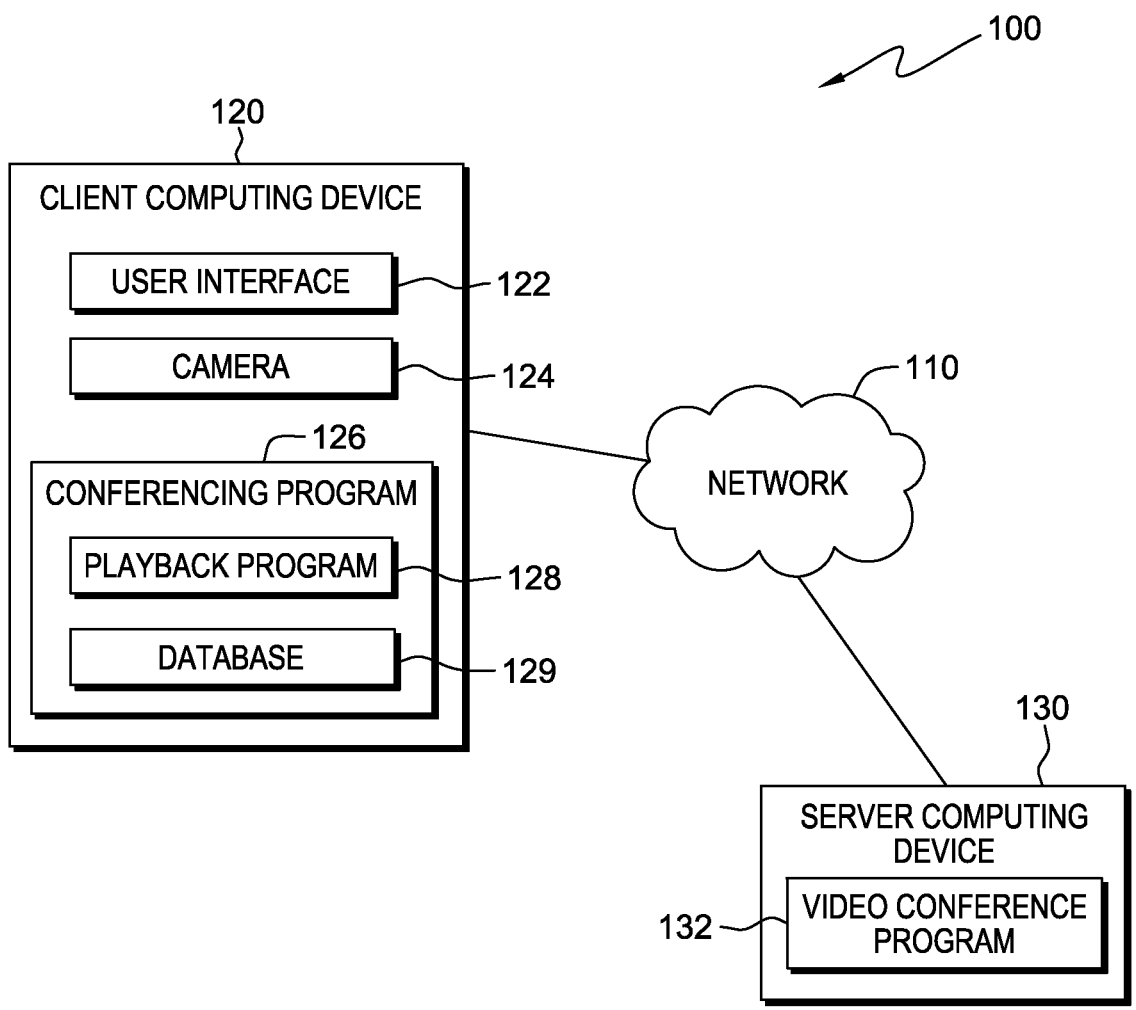
FIG. 1 is a functional block diagram illustrating a distributed data processing environment having a client computing device that includes a conferencing program and a playback program, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by, or in connection with, an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program codes embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other device to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other device to cause a series of operational steps to be performed on the computer, other programmable apparatus or other device to produce a computer-implemented process such that the instructions which execute on the computer or other programmable apparatus provide processes for implementing the functions/acts specified in the flowchart and/or block diagram block or blocks.

The present invention will now be described in detail with reference to the figures. FIG. 1 is a functional block diagram illustrating a distributed data processing environment, generally designated 100, in accordance with one embodiment of the present invention.

Distributed data processing environment 100 includes client computing device 120 and server computing device 130, interconnected over network 110. In an exemplary embodiment of the present invention, distributed data processing environment 100 represents a video conferencing environment, where conference participants communicate via a network, such as network 110. Network 110 can be, for example, a local area network (LAN), a wide area network (WAN) such as the Internet, or a combination of the two, and can include wired, wireless, or fiber optic connections. In general, network 110 can be any combination of connections and protocols that will support communication between client computing device 120 and server computing device 130.

Client computing device 120 includes user interface (UI) 122, camera 124, conferencing program 126, playback program 128, and database 129. In various embodiments of the present invention, client computing device 120 can be a laptop computer, a personal digital assistant (PDA), a smart phone, or any programmable electronic device capable of recording and displaying video and communicating with server computing device 130 via network 110. UI 122 may be, for example, a graphical user interface (GUI) or a web user interface (WUI) and can display text, documents, web browser windows, video, user options, application interfaces and instructions for operation. Client computing device 120 may include internal and external hardware components, as depicted and described in further detail with respect to FIG. 4. Camera 124 may be included as an internal component of client computing device 120 or may be an external camera connected to client computing device 120 via a communication cable, such as a universal series bus (USB) cable. Camera 124 can include motion sensors and required motion sensing technology to communicate with client computing device 120. Camera 124 creates a video link which can allow client computing device 120 to act as a videoconference station when connected to video conference program 132 on server computing device 130.

Conferencing program 126 can be any platform that can host a live video conference on client computing device 120 allowing a user of the client computing device to communicate with participants in the live video conference in other locations by two-way video and audio transmissions. For example, conferencing program 126 may be Lotus Live, Google Hangouts, Facebook video chat, Skype, Google video chat, or any program capable of hosting a video conference on client computing device 120. Conferencing program 126 can connect to other participants in a live video conference using a video conferencing program via network 110, such as video conference program 132 on server computing device 130.

Playback program 128 detects conferencing program 126 has accessed, or joined, a live video conference. Playback program 128 can allow a user to record content, for example, a short video clip, using camera 124, and play the content in the live feed video conference. In an exemplary embodiment of the present invention, playback program 128 prompts a user to record a short video clip. In various embodiments of the present invention, a user may use an existing video clip that is stored in database 129 on client computing device 120. In the exemplary embodiment, playback program 128 records the short video clip of the user, and when prompted, can insert the short video clip into the live video conference accessed via conferencing program 126. In various embodiments of the present invention, playback program 128 may be located elsewhere within distributed data processing environment 100, or may be otherwise accessible to a user of client computing device 120 via network 110, such as a download available on the Internet. Playback program 128 may also be made available as an add-on for conferencing program 126. In various embodiments of the present invention, database 129 may be located elsewhere within distributed data processing environment 100 and can communicate with playback program 128 via network 110.

Server computing device 130 includes video conference program 132. In order to establish a live video conference, at least one other client computing device (not shown) connects to video conference program 132 via network 110. Video conference program 132 allows participants, or users of client computing devices connected via network 110, to interact through live data streaming. Server computing device 130 may include data storage or function as part of the World Wide Web (WWW) and can include spreadsheets, web browser pages or other documents that can be searched for and downloaded to client computing device 120 via network 110 for viewing by a user. Server computing device 130 can be a laptop computer, a tablet computer, a netbook computer, a personal computer (PC), a desktop computer, a personal digital assistant (PDA), a smart phone, or any programmable electronic device capable of communicating with client computing device 120 via network 110 and with various components and devices within distributed data processing environment 100. Server computing device 130 may represent a computing system utilizing clustered computers and components to act as a single pool of seamless resources when accessed through a network. This is a common implementation for data centers and for cloud computing applications.

Figure 2:
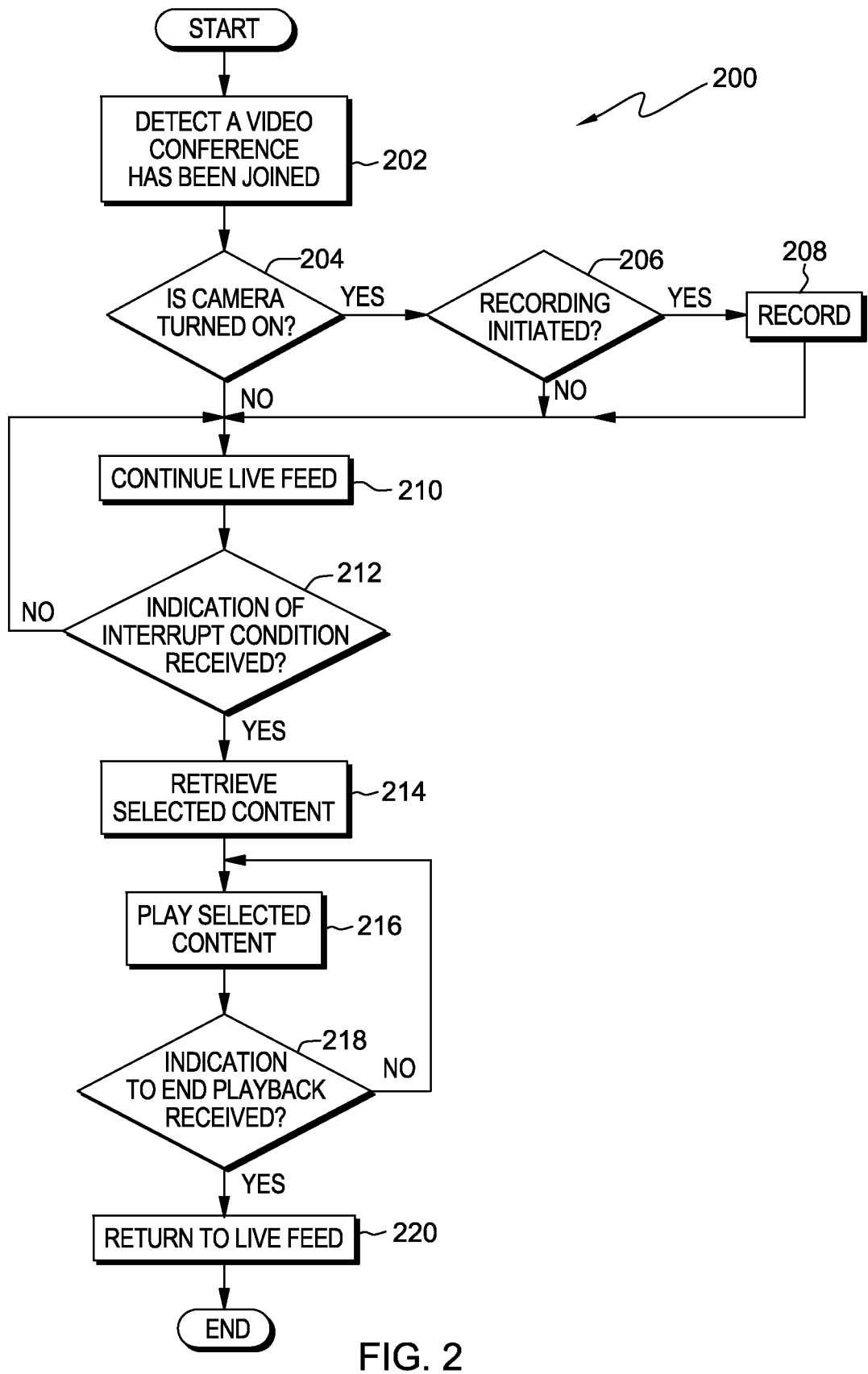
FIG. 2 is a flowchart depicting operational steps of the playback program, of FIG. 1, for inserting and playing a video clip in a live video conference, in accordance with an embodiment of the present invention.

FIG. 2 is a flowchart 200 depicting operational steps of playback program 128 for inserting and playing a video clip into a live video conference, in accordance with an embodiment of the present invention.

Playback program 128 detects a live video conference has been joined, or accessed (block 202). In an exemplary embodiment, conferencing program 126, within which playback program 128 operates, communicates with other participants in the live video conference via video conference program 132 and network 110. In various embodiments of the present invention, a video conference may already be in progress, or may not have started yet.

Playback program 128 determines if camera 124 is turned on (decision block 204). A user can turn on camera 124 and join a video conference through a live feed. If playback program 128 determines that camera 124 is not turned on (the "NO" branch of decision block 204), the program continues to display the live feed of the video conference (block 210). If playback program 128 determines that camera 124 is turned on (the "YES" branch of decision block 204), the program will determine if a user has initiated recording (decision block 206). If playback program 128 determines a recording has not been initiated (the "NO" branch of decision block 206), the program will continue to display the live feed of the video conference (block 210). Otherwise, if playback program 128 determines a user has initiated a recording (the "YES" branch of decision block 206), the program begins recording content, for example, a video clip, using camera 124 (block 208). Next, the program will continue to display the live feed of the video conference (block 210). Thus, in various embodiments of the present invention, playback program 128 can continue to display the live feed of the video conference via UI 122 while recording is taking place.

Playback program 128 may determine a user has initiated a recording by receiving communication via UI 122, such as receiving input a "record" option has been selected. The length of the video clip can be determined by a user. For example, a user may record a video clip of themselves for a pre-determined time, such as 30 seconds, or a user may allow the recording to continue until further action by the user. The content of the video clip may also be determined by the user. For example, a user may record themselves in a particular outfit and with a particular background environment in order to ensure they appear the same during the live video conference and during the recorded content. Playback program 128 can store recorded content temporarily within playback program 128 or in database 129 on client computing device 120.

Subsequently, playback program 128 determines if an indication of an interrupt condition is received (decision block 212). An indication of an interrupt condition is any action or circumstance that indicates the live feed of the video conference is to be interrupted. An indication of an interrupt condition may include such actions as dimming the lights, detecting another person has entered the room or the frame, and receiving a phone call. In an embodiment of the present invention, playback program 128 may include a "play" option, which can be added as an option within conferencing program 126 and displayed on UI 122, and which a user may select to indicate an interruption of the live feed of the video conference. A user may pre-determine within playback program 128 an interrupt condition, or playback program 128 may include default settings. A default setting may be, for example, identifying a disruption in a network connection as an interrupt condition. In an exemplary embodiment of the present invention, an interrupt condition is not necessarily a condition or action that disrupts the live feed of the live video conference, such as a weak network connection, but is instead a user preference, and the user can determine what conditions or actions will interrupt the live video conference and further operation of playback program 128.

In various embodiments of the present invention, an indication of an interrupt condition can include detecting with motion sensors included with camera 124 a change in the user's environment, such as a person entering the room, detecting the user performing a recognized gesture, such as rubbing their eyes or a hand motion, and playback program 128 receiving a key sequence or combination, such as "Ctrl+Alt+L". In an embodiment of the present invention, playback program 128 can include a "mute/un-mute" option for indicating an interrupt condition. A user may toggle between mute and un-mute according to whether the user wants to play a recorded video, for example, while on mute, or participate in the live video conference, for example, while un-mute is selected. If playback program 128 determines an indication of interrupt is not received (the "NO" branch of decision block 212), the program will continue to display the live feed of the video conference (block 210). Otherwise, if playback program 128 determines that an indication of interrupt is received (the "YES" branch of decision block 212), the program will retrieve selected content (block 214). In various embodiments of the present invention, content can be a video clip or a voice recording. A user of client computing device 120 may select a previously recorded video in temporary storage within playback program 128 or stored in database 129.

Next, playback program 128 plays the selected content in the live video conference (block 216). Playback program 128 inserts the selected content, interrupting the live feed, and plays the content in the live video conference, so that the selected content is displayed to participants in the live video conference. In various embodiments of the present invention, a buffering option may be selected. If a buffering option is selected, playback program 128 prompts a user to select a pre-recorded video clip. Playback program 128 begins buffering the selected pre-recorded video clip. While playback program 128 is running, the buffering option ensures the transition from a live video feed to a recorded clip is smooth, and has no cutout. When the buffering option is selected, playback program 128 plays the length of the video that has been buffered for the user.

Subsequently, playback program 128 determines if an indication to end playback is received (decision block 218). An indication to end playback may include detecting with motion sensors a change in the user's environment, or receiving a key sequence or combination. If an indication to end playback is not received (the "NO" branch of decision block 218), playback program 128 continues to play the selected content. Otherwise, if playback program 128 determines there is an indication to end playback (the "YES" branch of decision block 218), the program ends playback and removes the received content and returns to live feed of the video conference (block 220).

Figure 3:
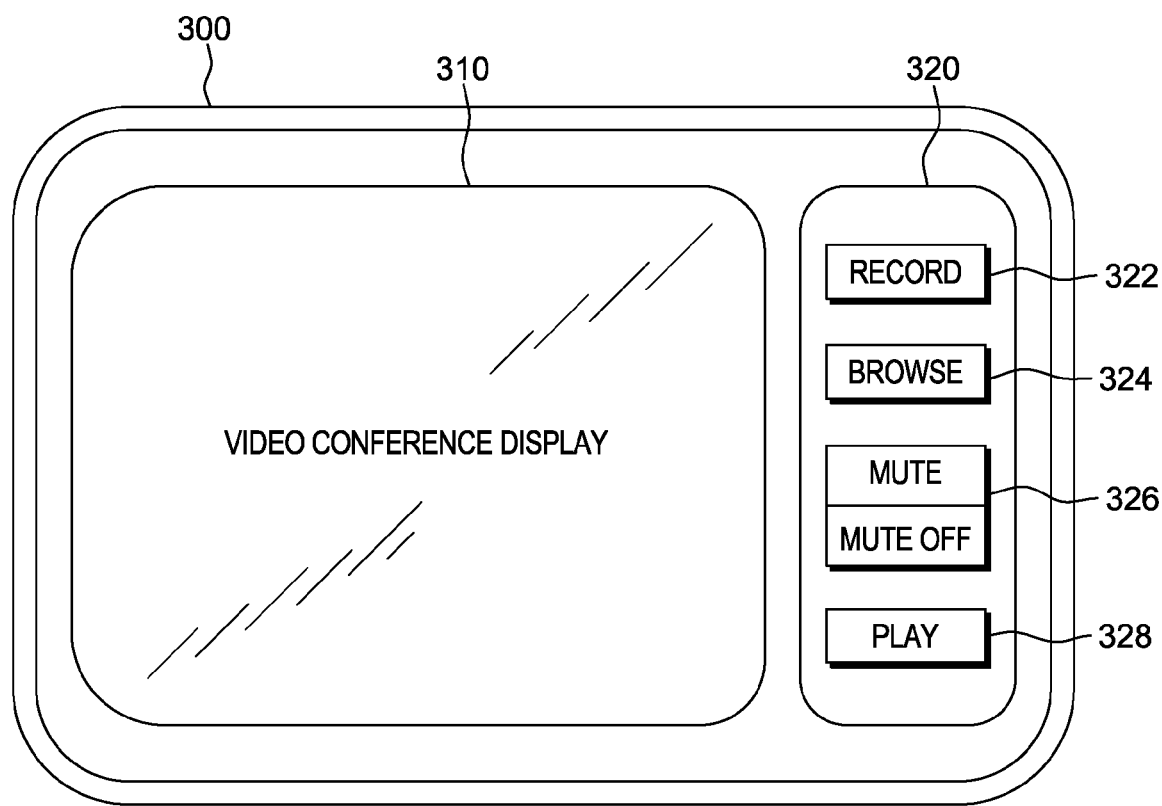
FIG. 3 illustrates an exemplary user interface for use by a user of the conferencing program of FIG. 1, in accordance with an embodiment of the present invention.

FIG. 3 illustrates an exemplary user interface, such as UI 122 on client computing device 120, in accordance with an embodiment of the present invention.

In an exemplary embodiment of the present invention, a live video conference, displayed on UI 122 of client computing device 120, is shown on video conference display 310 of device 300. Options for operation of playback program 128 are displayed in box 320. Box 320 contains record 322, browse 324, mute option 326, and play 328. Playback program 128 detects whether a camera connected to device 300 is turned on, and if so, a user may select record 322 to begin recording content. In order to determine content to insert into video conference display 310, a user may select browse 324 to browse temporary storage in playback program 128 or storage on client computing device 120, such as database 129. A user may select mute option 326 or play 328 in order to indicate to playback program 128 an interrupt condition. Mute option 326 can allow a user to toggle between playing selected content and the live feed of the video conference, and play 328 can allow a user to play selected content.

Figure 4:
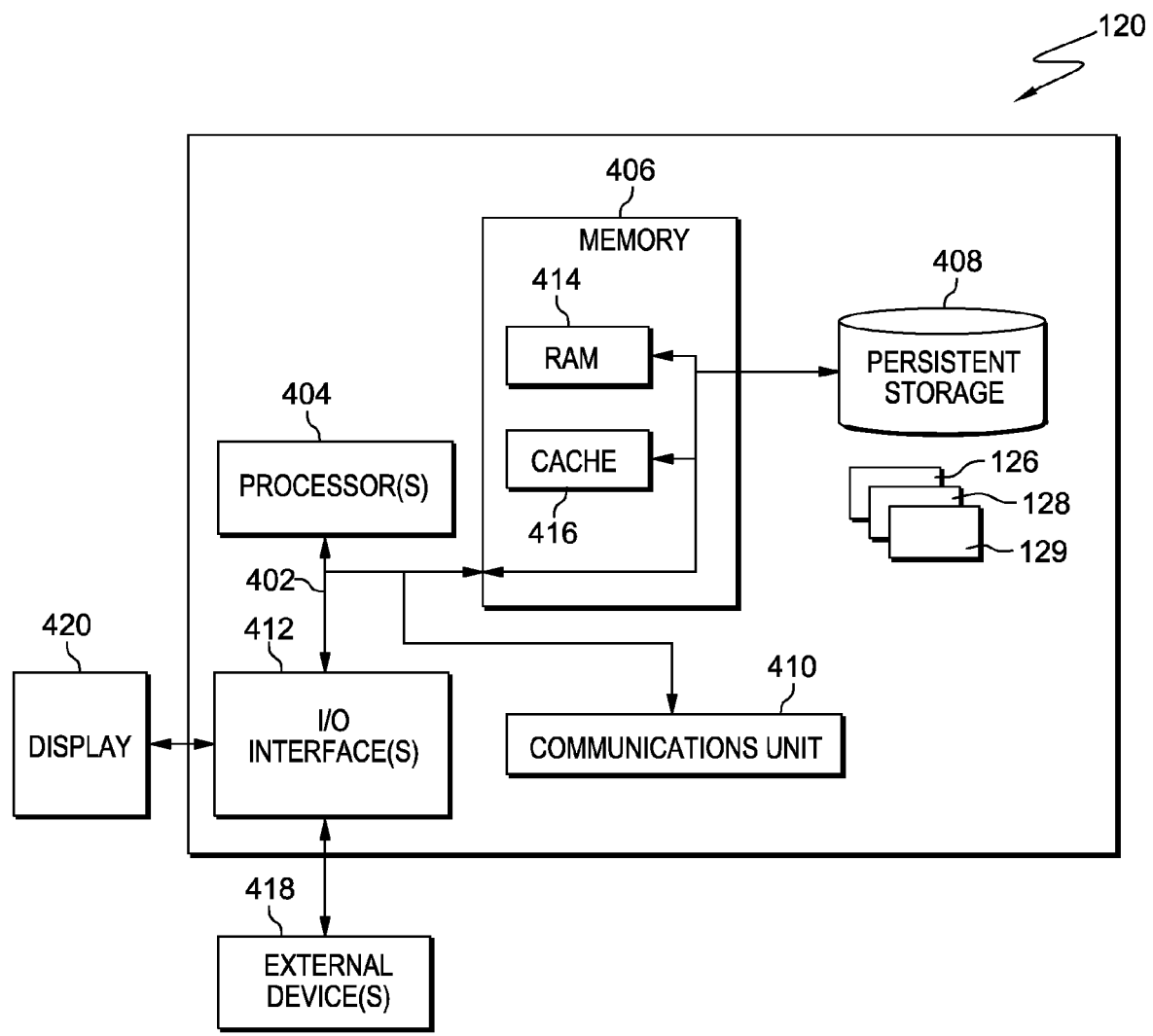
FIG. 4 depicts a block diagram of the internal and external components of a data processing system, such as the client computing device of FIG. 1, in accordance with an embodiment of the present invention.

FIG. 4 depicts a block diagram of components of client computing device 120, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Client computing device 120 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache 416. In general, memory 406 can include any suitable volatile or non-volatile computer-readable storage media.

Conferencing program 126, playback program 128, and database 129 can be stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including between client computing device 120 and server computing device 130. In these examples, communications unit 410 includes one or more network interface cards. Communications unit 410 may provide communications through the use of either or both physical and wireless communications links. Conferencing program 126, playback program 128, and database 129 may be downloaded to persistent storage 408 through communications unit 410.

I/O interface(s) 412 allows for input and output of data with other devices that may be connected to client computing device 120. For example, I/O interface 412 may provide a connection to external device(s) 418 such as a keyboard, keypad, a touch screen, and/or some other suitable input device. External device(s) 418 can also include portable computer-readable storage media such as, for example, thumb drives, portable optical or magnetic disks, and memory cards. External device(s) 418 may include a camera or other imaging device. In an alternative embodiment, a camera or other imaging device may be included as an internal component of client computing device 120. Software and data used to practice embodiments of the present invention, e.g., conferencing program 126, playback program 128, and database 129 can be stored on such portable computer-readable storage media and can be loaded onto persistent storage 408 via I/O interface(s) 412. I/O interface(s) 412 also connect to a display 420. Display 420 provides a mechanism to display data to a user and may be, for example, a computer monitor or an incorporated display screen, such as is used in tablet computers and smart phones.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for streaming playback within a live video conference, the method comprising:
a computer detecting access to a video conference using a live interface;
the computer receiving an indication of an interrupt condition, wherein the indication of an interrupt condition is a circumstance indicating a live feed of the live video conference is to be interrupted;
the computer retrieving, in response to the indication of an interrupt condition, a selected content;
the computer inserting the selected content into the video conference;
the computer playing the selected content within the video conference;
the computer receiving an indication to end play of the selected content; and
the computer removing the selected content from the live video conference.

2. The method of claim 1, wherein an interrupt condition includes one or more of: a lighting adjustment, a detected motion, a detected sound, a disruption of a network connection, and a received key sequence.

3. The method of claim 2, wherein the detected motion further comprises:
the computer detecting, based, at least in part, on using motion sensors, a user of the computer; and
the computer detecting another person in a frame of the computer.

4. The method of claim 1, wherein the selected content is a video clip.

5. The method of claim 1, wherein the computer retrieving the selected content further comprises:
the computer detecting a camera connected to the computer is currently recording;

the computer receiving a recorded content from the camera; and the computer storing the recorded content.

6. A computer program product for streaming playback within a live video conference, the computer program product comprising:

one or more computer-readable tangible storage device and program instructions stored on the one or more computer-readable tangible storage device, the program instructions comprising:

program instructions to detect access to a video conference using a live interface;

program instructions to receive an indication of an interrupt condition, wherein the indication of an interrupt condition is a circumstance indicating a live feed of the live video conference is to be interrupted;

program instructions to retrieve, in response to the indication of an interrupt condition, a selected content;

program instructions to insert the selected content into the video conference;

program instructions to play the selected content within the video conference;

program instructions to receive an indication to end play of the selected content; and program instructions to remove the selected content from the live video conference.

7. The computer program product of claim 6, wherein an interrupt condition includes one or more of: a lighting adjustment, a detected motion, a detected sound, a disruption of a network connection, and a received key sequence.

8. The computer program product of claim 7, wherein the detected motion further comprises:

program instructions to detect, based, at least in part, on using motion sensors, a user of the computer; and program instructions to detect another person in a frame of the computer.

9. The computer program product of claim 6, wherein the selected content is a video clip.

10. The computer program product of claim 6, wherein the program instructions to retrieve the selected content further comprise:

program instructions to detect a camera connected to the computer is currently recording;

program instructions to receive a recorded content from the camera; and program instructions to store the recorded content.

11. A computer system for streaming playback within a live video conference, the computer system comprising:

one or more computer processors;

one or more computer-readable tangible storage media;

program instructions stored on the one or more computer-readable tangible storage media for execution by at least one of the one or more computer processors, the program instructions comprising:

program instructions to detect access to a video conference using a live interface;

program instructions to receive an indication of an interrupt condition, wherein the indication of an interrupt condition is a circumstance indicating a live feed of the live video conference is to be interrupted;

program instructions to retrieve, in response to the indication of an interrupt condition, a selected content;

program instructions to insert the selected content into the video conference;

program instructions to play the selected content within the video conference;

program instructions to receive an indication to end play of the selected content; and program instructions to remove the selected content from the live video conference.

12. The computer system of claim 11, wherein an interrupt condition includes one or more of: a lighting adjustment, a detected motion, a detected sound, a disruption of a network connection, and a received key sequence.

13. The computer system of claim 12, wherein the detected motion further comprises:

program instructions to detect, based, at least in part, on using motion sensors, a user of the computer; and program instructions to detect another person in a frame of the computer.

14. The computer system of claim 11, wherein the selected content is a video clip.

15. The computer system of claim 11, wherein the program instructions to retrieve the selected content further comprise:

program instructions to detect a camera connected to the computer is currently recording;

program instructions to receive a recorded content from the camera; and program instructions to store the recorded content.

16. The method of claim 1, wherein the interrupt condition includes a toggle option, the toggle option allowing the user to toggle between playing the selected content in the live video conference and participating in the live video conference.

17. The computer program product of claim 6, wherein the interrupt condition includes a toggle option, the toggle option allowing the user to toggle between playing the selected content in the live video conference and participating in the live video conference.

18. The computer system of claim 11, wherein the interrupt condition includes a toggle option, the toggle option allowing the user to toggle between playing the selected content in the live video conference and participating in the live video conference.

* * * * *